US006963929B1

(12) United States Patent
Lee

(10) Patent No.: US 6,963,929 B1
(45) Date of Patent: Nov. 8, 2005

(54) INTERNET E-MAIL ADD-ON SERVICE SYSTEM

(76) Inventor: Soobok Lee, Postel Services, Co. AnamTower 2018, Yoksam-dong 702-10, Kangnam-ku, Seoul (KR) 135-080

( * ) Notice: Subject to any disclaimer, the term of this patent is extended or adjusted under 35 U.S.C. 154(b) by 0 days.

(21) Appl. No.: 09/889,187

(22) PCT Filed: Jan. 11, 2000

(86) PCT No.: PCT/KR00/00012

§ 371 (c)(1),
(2), (4) Date: Jul. 11, 2001

(87) PCT Pub. No.: WO00/42747

PCT Pub. Date: Jul. 20, 2000

(30) Foreign Application Priority Data

Jan. 13, 1999 (KR) .................................. 1999-638

(51) Int. Cl.[7] ...................... G06F 15/16; G06F 15/173; H04L 12/28
(52) U.S. Cl. ...................... 709/245; 709/206; 709/207; 709/229; 709/242; 370/351
(58) Field of Search ............................... 709/206, 220, 709/203, 207, 225, 229, 238, 242, 245; 370/351–356

(56) References Cited

U.S. PATENT DOCUMENTS

| 5,023,777 A | | 6/1991 | Sawamoto | |
|---|---|---|---|---|
| 5,790,790 A | * | 8/1998 | Smith et al. | 709/206 |
| 5,805,810 A | * | 9/1998 | Maxwell | 709/206 |
| 5,856,974 A | | 1/1999 | Gervais et al. | |
| 6,061,660 A | * | 5/2000 | Eggleston et al. | 705/14 |
| 6,151,624 A | * | 11/2000 | Teare et al. | 709/217 |
| 6,463,462 B1 | * | 10/2002 | Smith et al. | 709/206 |
| 6,519,646 B1 | * | 2/2003 | Gupta et al. | 709/229 |
| 6,836,792 B1 | * | 12/2004 | Chen | 709/220 |
| 6,839,738 B2 | * | 1/2005 | Quine et al. | 709/206 |

FOREIGN PATENT DOCUMENTS

| WO | WO 98/18249 | | 4/1998 | |
|---|---|---|---|---|
| WO | WO 02/065320 | * | 8/2002 | G06F 15/16 |

OTHER PUBLICATIONS

D. Mills, "Internet Name Domains", RFC-799, COMSAT, Sep. 1981. http://www.Ietf.org/rfc/rfc0799.txt.
Z. Su and J. Postel, "The Domain Naming Convention for Internet User Applications", RFC-819, Network Information Center, SRI International, Aug. 1982, http://www.ietf.org/rfc/rfc0819.txt.
J. Postel, "Simple Mail Transfer Protocol", RFC-821, USC/Information Sciences Instittue, Aug. 1980. http://www.ietf.org/rfc/rfc0821.txt.
P. Mockapetris, "Domain Names—Concepts and Facilities", RFC-1034, ISI, Nov. 1987. http://www.Ietf.org/rfc/rfc1034.txt.
R. Fajman, "An Extensible Message Format for Message Disposition Notifications", RFC-2298, Mar. 1998. http://www.ietf.org/rfc/rfc2298.txt.

* cited by examiner

*Primary Examiner*—Saleh Najjar
*Assistant Examiner*—Kevin Bates
(74) *Attorney, Agent, or Firm*—Oppedahl & Larson LLP

(57) ABSTRACT

A system and method is provided for constructing an internet e-mail add-on service system that can seamlessly operate on the conventional SMTP internet message transport network. The method and system make use of a recipient e-mail address extended by a domain suffix. The domain suffix portion specifies both the kind of e-mail add-on services to be applied and the intermediate mail relay server to perform the service on the message before delivery to the recipient.

9 Claims, 2 Drawing Sheets

INTERNET E-MAIL ADD-ON SERVICE SYSTEM

TECHNICAL FIELD

The present invention relates to a system and a method for structuring an e-mail add-on service such as a service for interpreting a message into other natural language, a mail read confirmation notification service, a lottery mail sending service and a Christmas picture post-card transmitting service, which are not considered as a basic function of the e-mail.

BACKGROUND ART

In this specification, the e-mail add-on service is defined as a service, which is not considered as a basic function of the common e-mail service among services related to the Internet e-mail. Such service may be a service for interpreting a message into other natural language, a mail read confirmation notification service, a lottery mail sending service or a Christmas picture post-card transmitting service. The Internet Engineering Task Force (IETF) already provides the international standard for the mail read confirmation notification service (RFC (Request for Comments) 2298). However, because the mail read confirmation notification service could be used only when a sender and a receiver use mail client software supporting the standard at the same time, the service is not broadly used. Also, the lottery mail sending service and the Christmas picture post-card transmitting service are not prospective to be used as a basic function of the mail client software or the mail server software because they have no need or impossible to be standardized. The Christmas picture post-card is commonly provided in WWW (World Wide Web) service.

On the Internet having characteristics of decentralized control authority, no service provider has an authority to change the mail server software or the mail client software of the sender and the receiver for providing a specific e-mail add-on service over the world.

DISCLOSURE OF INVENTION

The object of the invention is to build an independent e-mail add-on service system which is compatible with the universal e-mail infrastructure of the Internet and may give a service having a specific add-on function designated by a sender over the whole Internet by using interconnection with the universal e-mail infrastructure.

In order that a service provider may independently provide a service over the world at once, it is necessary that the service should not request any change of the universal infrastructure of the e-mail client software and the server software, in which a lot of time and money have already invested and which has decentralized authorities.

For satisfying the necessity, the present invention employs a relay-mode mail server which is interposed into an intermediate transmission path between mail servers of a sender and a receiver in order to process a message required for the add-on service.

Generally, a message, which the sender transmits through the mail client server, is transmitted through a SMTP (Simple Mail Transfer Protocol) and then stored in a queue in a receiver-SMTP server, designated in installing the mail client. The receiver-SMTP server then determines to which Internet host the message is transmitted on basis of a "DOMAIN" portion of a receiver address "USERID@DOMAIN" designated in the message (see RFC822, RFC821 in IETF).

The "DOMAIN" portion is the only position where a relay-mode mail server executing the add-on service may be inserted into the common mail transmission path. At this time, the sender should use a new receiver mail address by replacing the "DOMAIN" portion of the receiver mail address into an Internet host name ("DOMAIN-NEW") having the relay-mode mail server. In addition, the "DOMAIN-NEW" should include the "DOMAIN" portion in a distinguishable manner and maintain minimum amount of information to relay the message having the add-on service to the receiver mail server.

Therefore, the present invention defines a Domain Suffix (hereinafter, referred to as ".suffix") according to the add-on service and its option. The present invention attaches the ".suffix" after the "DOMAIN" portion of the receiver mail address in order to form a full name of "DOMAIN.suffix". The present invention then adopts the "DOMAIN.suffix" as the Internet host name of the relay-mode mail server.

Based on such idea, a method of systematically structuring the e-mail add-on service system will be explained in the below description.

WO98181249A1 is a reference of the present invention.

BRIEF DESCRIPTION OF THE DRAWINGS

These and other features, aspects, and advantages of preferred embodiments of the present invention will be more fully described in the following detailed description, taken accompanying drawings. In the drawings.

BEST MODES FOR CARRYING OUT THE INVENTION

Figure 1:
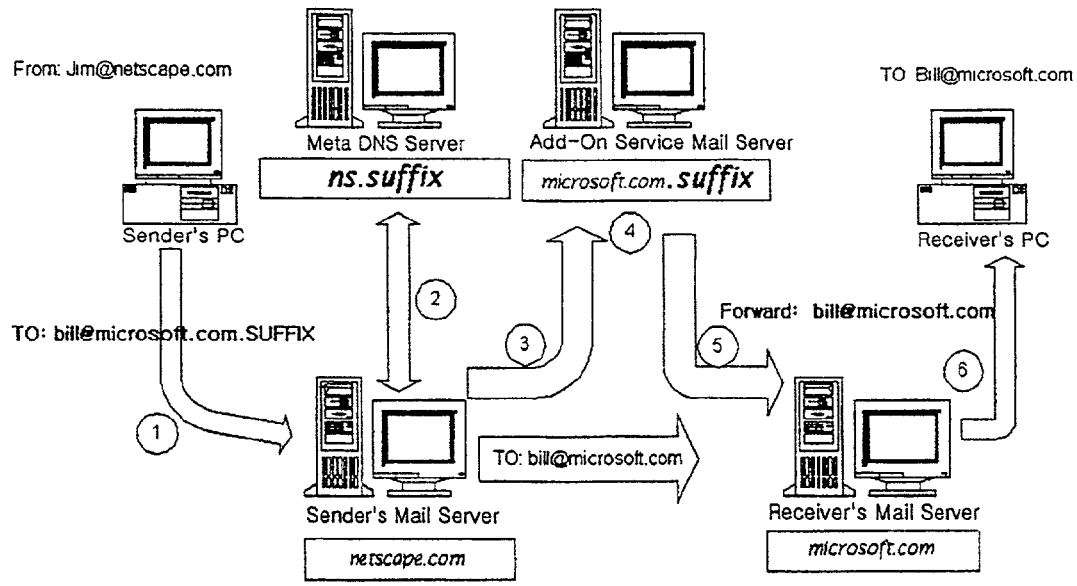
FIG. 1 shows e-mail flows for a sender to transmitting a mail to "USERID@DOMAIN" and "USERID@DOMAIN.suffix"

The e-mail add-on service system of the present invention includes three elements.

First Element

A domain suffix e-mail address representation system including a syntax of a mail address having a form of "USERID@DOMAIN.suffix", which attaches a domain suffix corresponding to the add-on service, and a series of definition for meaning of the syntax. By attaching the domain suffix, the domain suffix e-mail address representation system specifies a type of the add-on service and designates a service host in charge of the add-on service.

Second Element

A message modifying-type relay mode add-on service mail server for receiving an e-mail message having a receiver address "USERID@DOMAIN.suffix", processing the e-mail message according to the type and option of the add-on service designated by the ".suffix", and transmitting the processed e-mail message to the original receiver address "USERID@DOMAIN".

Third Element

A Meta domain name system for corresponding the "DOMAIN.suffix" to an Internet Protocol (IP) address of a relay mode mail server host in charge of the add-on service of the "DOMAIN".

Next, the three elements are described in detail together with four Internet add-on service subsystems, which may be realized as a subsystem of a common system.

1. Domain Suffix E-mail Address Representation System

First Element

The address representation system of the present invention has a characteristic in point of attaching a domain suffix after a receiver e-mail address. Such characteristic is powerful in that the domain suffix may specify a type of the add-on service and designate a service host in charge of the add-on service at the same time. Users of the add-on service recognizes such representation method to be identical to a usage method of the e-mail add-on service.

The domain suffix of each add-on service always has a root domain suffix and a supplementary domain suffix. The root domain suffix should be a dependent domain registered in the Internet or a child domain of the dependent domain.

For best understanding, let's take two examples using a main domain suffix ".confirm.to" for the mail read confirmation notification service and a supplementary domain suffix having ".add" in the beginning. In the case of "apple.com.add.startec.advertizement.confirm.to", "apple.com" is the "DOMAIN" portion, "add.startec.advertizement" is the supplementary domain suffix and ".confirm.to" is the root domain suffix. In the case of "apple.com.confirm.to", it is considered that the supplementary domain suffix has a null string value. As a reference, ".to" among ".confirm.to" is a country top-level domain of the kingdom of Tonga, which may be replaced with an international registration with ".com" or ".net".

The supplementary domain suffix is attached between the original mail address domain name and the root domain suffix for flourishing or limiting a function of the add-on service. A range of the character string occupied by the supplementary domain suffix may be defined depending on the add-on service. A supplementary domain suffix in a syntax having a variable parameter may have unlimited character string value.

microsoft.com.add.*.photo.post-card.to.    IN    A 202.30.244.18

2. Relay Mode Add-on Service Mail Server

The relay mode add-on service mail server receives and processes a mail message having a receiver address "USERID@DOMAIN.suffix", and has three characteristics below.

First, the server is installed on an Internet host having a "DOMAIN.suffix" type domain name.

Second, the server is interposed during transmitting a mail message from a sender mail server to a receiver mail server and relays the message after processing in order to apply the add-on service instead of the two mail servers, that is, in a relay mode.

Third, the server has a characteristic of a message modifying mail server which may modify a message according to the corresponding add-on service on basis of a root domain suffix and a supplementary domain suffix specified in the receiver address "USERID@DOMAIN.suffix".

2-1. Advantages of the Relay Mode Add-on Service Mail Server

First, the server does not need to change existing mail servers of a sender and a receiver. The relay mode add-on service mail server may naturally expand functions of the two mail servers of the sender and the receiver by interposing into a transmission path between the sender mail server and the receiver mail server.

Second, the relay mode add-on service mail server may independently provide the add-on service over the world at once without any assistance of the sender/receiver DOMAIN manager because the server is independent of the mail servers of the sender/receiver mail DOMAIN in view of operation and management.

Third, because the sender designates the "DOMAIN.suffix" as the first mail receiving server, the relay mode add-on service mail server may provide an e-mail add-on service to the users of the DOMAIN without any interference or legal limitation from the manager.

Fourth, if structuring the Meta domain name system to correspond "DOMAIN.suffix" to an IP machine of one relay server machine for all DOMAINs, the relay mode add-on service mail server may provide the add-on service over the world at once with use of only one server. The relay mode mail server may be set up to transmit a final message to the receiving mail server after processing a requested operation based on ".suffix" regardless of a range of DOMAIN among the receiver address "DOMAIN.suffix". For the purpose of load distribution and security management, the server may be installed step by step by making side branches to a responsible relay server for each level.

2-2. Message Add-on Service Process

FIG. 1 comparatively shows e-mail flows when the sender transmits a mail to "USERID@DOMAIN" and to "USERID@DOMAIN.suffix", in which each part is described below in detail.

First, whatever address the sender designates, the mail message is added to a standby matrix of the receiver mail server to wait for transmission outside (process 1 of FIG. 1).

If the message's turn comes around, the mail server queries a root domain name server (referred to "ns.suffix", Meta domain name server) of ".suffix" domain in order to find out an IP address of the "DOMAIN.suffix" (process 2 of FIG. 1).

The message is transmitted to the IP address corresponding to the "DOMAIN.suffix" with use of SMTP (Simple Mail Transfer Protocol) (process 3 of FIG. 1). The "DOMAIN.suffix" server receiving the message then makes a new message by modifying the message or adding new content to the message according to characteristics of the add-on service (process 4 of FIG. 1).

After dividing the receiver e-mail address "USERID@DOMAIN.suffix" into the original receiver address "USERID@DOMAIN" and the domain suffix ".suffix", the domain suffix is divided again into the root domain suffix and the supplementary domain suffix in order to determine kind and content of the add-on service intended by the sender.

With making a modified new message by applying the add-on service to the message, a state information data record for each message is stored in a database of the server, if required. For this reason, each message is endowed with a message ID by generating a peculiar serial number.

The new message is then transmitted to the original receiver e-mail address "USERID@DOMAIN", which is a final receiver (process 5 in FIG. 1).

The receiver then reads the message stored in the receiver e-mail server with use of a mail client on his/her own person computer (process 6 in FIG. 1).

2-3. Message Database of the Message Modifying Mail Server

The state information of each mail message related to the add-on service may be stored in the "DOMAIN.suffix" host in order to not only keep the service operation on record but also accomplish a specific purpose of the add-on service through interaction with the receiver mail client.

There is an interactive add-on service, which realizes the add-on service by a series interactions with the "DOMAIN.suffix" and Internet after the receiver receives the mail. In this case, information of the message ID, which is a key for the state information database record, should be added to a message text or a mail header, finally transmitted to the receiver, in a suitable manner for the add-on service in any form.

3. Detailed Description of Meta Domain Name System

3-1. Background

The domain name is a name that describes peculiar names of all hierarchies consisting of host and network identifiers from right to left in a hierarchical name space by representing the names with ".(dot)" from the top-level hierarchy to the bottom-level hierarchy. For examples, there are www.microsoft.com, netscape.net, www.nic.go.kr, etc. At this time, ".com", ".net", ".kr" are called as a top-level domain (referred to TLD), and microsoft.com, netscape.net, go.kr are called as a second-level domain.

Domain Name System (DNS) is a worldwide decentralized database system for corresponding the domain name to a respective IP address. The DNS includes a database for relation between an Internet domain name and an IP address (having A-type records) and an Internet e-mail transmission path database (having MX type records). The DNS also has all Internet TCP/IP communications for determining the flow and path for transmitting an e-mail from a sender to a receiver (see RFC1034, RFC1035 of IETF).

The domain name is designated to a primary domain name server for each hierarchy for corresponding IP addresses of each of domain and sub-domain to the server. For example, in the case of www.cs.uiuc.edu, the top-level domain ".edu" is designated to "ns.internic.net" as the primary domain name server, while "uiuc.edu" is designated to "ns.uiuc.edu (Illinois Univ.)" as the primary domain name server. Such role assignment is accomplished by adding, to the domain name database of "ns.internic.net", a content (NS type record) of delegating the primary domain name server managing authority for the "unic.edu" to the "ns.uiuc.edu".

A manager of the "ns.unic.edu" determines whether the "cs.uiuc.edu" and the "www.cs.uiuc.edu" have whole authority of the primary domain name server for each sub-domain.

Returning to the subject, there is need to build a primary domain name server for ".suffix" because "DOMAIN.suffix" is a sub-domain name of a specific domain ".suffix". However, in the Internet where domains are dynamically created and deleted, it is impossible to make database records of "DOMAIN.suffix" for all DOMAINs in view of decentralized characteristics and size of the Internet. Particularly, it is even more impossible when the DOMAIN includes a supplementary domain suffix having a variable parameter.

The Meta Domain Name System of the present invention means a domain name system having a particular database (Meta Domain Database) for managing a domain name of a "DOMAIN.suffix" type. Such system should be built on a primary domain name server host in charge of a dependent domain name of the primary domain suffix preferentially. The server software for providing a service of the Meta domain name database will be called as the Meta Domain Name Server.

3-2. Characteristics of Meta Domain Name System

The Meta domain name server operates identical to a common domain name server in view of DNS protocol interaction with outside (see RFC1034, RFC1035 of IETF), but has three characteristics in view of database configuration.

First, a resource record of all domain name database managed by the Meta domain name server basically has a wildcard attribute.

Second, a more specific one among the resource records has a priority in selecting IP address query result.

Third, in case that the add-on service uses a parameterized supplementary domain suffix, the domain name database supports analysis of the resource record with representation of a variable parameter.

The core of the Meta domain name server is in such database constructing method. The domain name server software is just means for providing the database, and most of common up-to-date name server software supports such database construction directly or indirectly.

3-3. Explanation for each Characteristic

First, in case that the root domain suffix is ".conform.to" as an example, assume that the domain name database resource record has a below form for "apple.com.confirm.to" (the real input database record may be not identical to the above, and it is different according to a used domain name server software).

apple.com.confirm.to. IN A 202.30.244.15

At this time, if "apple.com.confirm.to" record has the wildcard attribute, all sub-domains after "apple.com" are always corresponded to same value as an IP address of "apple.com.conform.to". That is, it is considered as "*.apple.com.confirm.to" as if a wildcard character *(asterisk) of UNIX shell command is omitted in the front. Therefore, "host1.marketing.apple.com.confirm.to" and "host2.korea.international. apple.com.confirm.to" match with the same "*.apple.com.confirm.to" so to correspond to the IP address of 202.30.244.15 like "apple.com.confirm.to".

Second, assume that the resource record should be divided because of requiring a separate relay-mode mail server only for "usa.apple.com.confirm.to" and its sub-domains. For the assumption, resource records are specified as follows.

usa.apple.com.conform.to. IN A 202.30.244.16
apple.com.confirm.to. IN A 202.30.244.15

At this time, it is meaningful that "usa.apple.com" has a priority to "apple.com". Because both records are considered to omit "*" in the front, there remains ambiguity that "*.usa.apple.com" may be considered to be included in "*.apple.com" in view of their forms. Therefore, for any domain name query, it should be clearly distinguished whether one has a priority between the two resource records.

At this time, it is defined that "usa.apple.com.confirm.to" is more specific than "apple.com.confirm.to", and the Meta domain name server is constructed that an IP address query result for more specific resource record has a priority.

On the other hand, in the beginning of the add-on service, if only one relay mail server host may process the add-on service for all DOMAINs, one resource record below will do.

confirm.to. IN A 202.30.244.15

Third, assume that a Christmas picture post-card sending add-on service uses a parameterized supplementary domain suffix, as an example. Assume that the root domain suffix is ".post-card.to" and a BNF syntax of the supplementary domain suffix is "add.* (midi|Photo)". Promise that ".*" portion is not a real character string "*" but a variable parameter, which may be replaced with other word selected by the sender.

1) bill@microsoft.com.post-card.to,
2) bill@microsoft.com.add.yosemite.park.photo.pose-card.to,
3) bill@microsoft.com.add.christmas.carol.song.midi.post-card.to For three receiver mail addresses, if the sender sets the supplementary domain suffix as a null string value (or does not designate the supplementary domain suffix) as described in the example 1), a content voluntarily designated by the server will be selected and sent in the post-card. In the example 2), "yosemite.park.photo" will be a variable parameter, while "christmas.carol.song.midi" will be a variable parameter in the example 3).

As a result, that the Meta domain name database supports the resource record having a parameterized supplementary domain suffix means that resource records in below can be designated by the Meta domain name database.

microsoft.com.add.*.midi.post-card.to.    IN    A    202.30.244.15
microsoft.com.add.*.girl.photo.post-card.to.    IN    A    202.30.244.16
microsoft.com.add.*.park.photo.post-card.to.    IN    A    202.30.244.17

4. Mail Read Confirmation Notification Service System 4-1. Background

The mail read confirmation notification service is a service to confirm the sender that the receiver receives and reads e-mail, of which method and procedure are standardized by IETF (RFC2298, http://www.inc.orglrfc2298). However, because the standard needs to change the e-mail server and the client software of the sender, it is delayed to spread the mail read confirmation notification service, which makes it difficult to provide the service over the world at once.

The mail read confirmation notification service is built as one specific concept of the Internet e-mail add-on service system of the present invention, which is characterized in that it may provide the mail read confirmation notification service only by that the sender attaches the domain suffix ".confirm.to" or ".confirm.cc" at the end of the receiver e-mail regardless of the standard of the Internet.

4-2. Configuration of E-mail Read Confirmation Notification Service System

Process 1: Based on the add-on service Meta mail address representation system of the Element 1 of the present invention, a formal Internet second domain may be registered by selecting a pair of second domains having same name, which has the root domain suffix for the e-mail read confirmation notification service and the top-level domain of ".to" and ".cc".

For example, if securing the Internet domain names "confirm.to" and "confirm.cc", the meaning of the add-on service for each domain suffix is defined as follows. If attaching the domain suffix ".comfirm.to" at the end of a mail address, the mail read confirmation notification is transmitted only to the sender when the mail is received. In case that there are at least two receivers, the domain suffix ".conform.cc" is attached in order to transmit the mail read confirmation notification not only to the sender but also to the receivers (if exist) when the mail is received. ".confirm." may be replaced with other domain such as receipt, notice, etc., if possible.

"to" is a standardized mail header name indicating a sender of e-mail, which is easily recognized by users. "cc (carbon copy)" is also a standardized mail header name, which may objectively transmit the meaning of sending a carbon copy of the mail read confirmation notification to be sent to the sender to other receiver. ".to." is a country top-level domain of the Kingdom of Tonga, while ".cc" is a country top-level domain of the Island of Cocus Keeling.

Process 2: Based on the Meta domain name system of the Element 3 of the present invention, two Meta domain name databases having the above two domain names as the root domain suffix are constructed. For the domain names having shapes of "DOMAIN.conform.to" and "DOMAIN.confirm.cc", a mail host machine in charge of the service is secured and an IP address thereof is registered.

Process 3: Based on the relay-mode add-on service mail server of the Element 2 of the present invention, a message modifying e-mail relay server system for realizing the mail read confirmation add-on service is established. The mail read confirmation service needs interaction between the receiver mail client and the relay sever. Therefore, the mail read state database record for each message is created and managed at the relay server when processing the message. Also, a suitable HTML (Hypertext Markup Language) tag is inserted into the text in the modified message in order to transmit a HTTP (Hypertext Transfer Protocol) query for automatic mail read confirmation notification to the relay server. Such server system is installed to each relay mail server host machine registered to the database in the Process 2.

Process 4: A web server is installed in the relay server in order to realize the mail read confirmation notification service through interaction between the receiver mail client and the relay server. The web server receives the HTTP query for a mail read state report from the receiver mail client, reflects the query on the mail read state database for each message, and then transmits a mail read confirmation notification.

Figure 2:
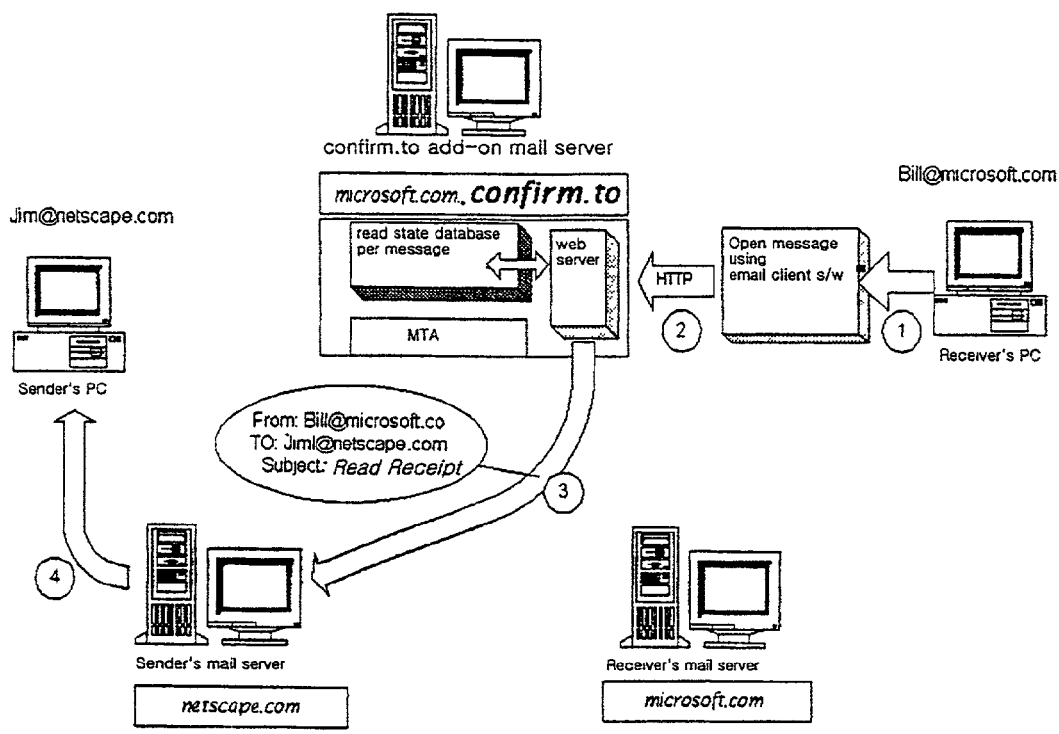
FIG. 2 shows interaction and flows among a Meta domain name server, an add-on service mail server and a web server of a mail read confirmation notification system.

FIG. 2 shows operation flows for illustrating interaction among the Meta domain name server, the add-on service mail server and the web server while the modified e-mail for the add-on service reaches at the final receiver after the sender sends the mail with attaching ".confirm.to" domain suffix at the end thereof.

Figure 3:
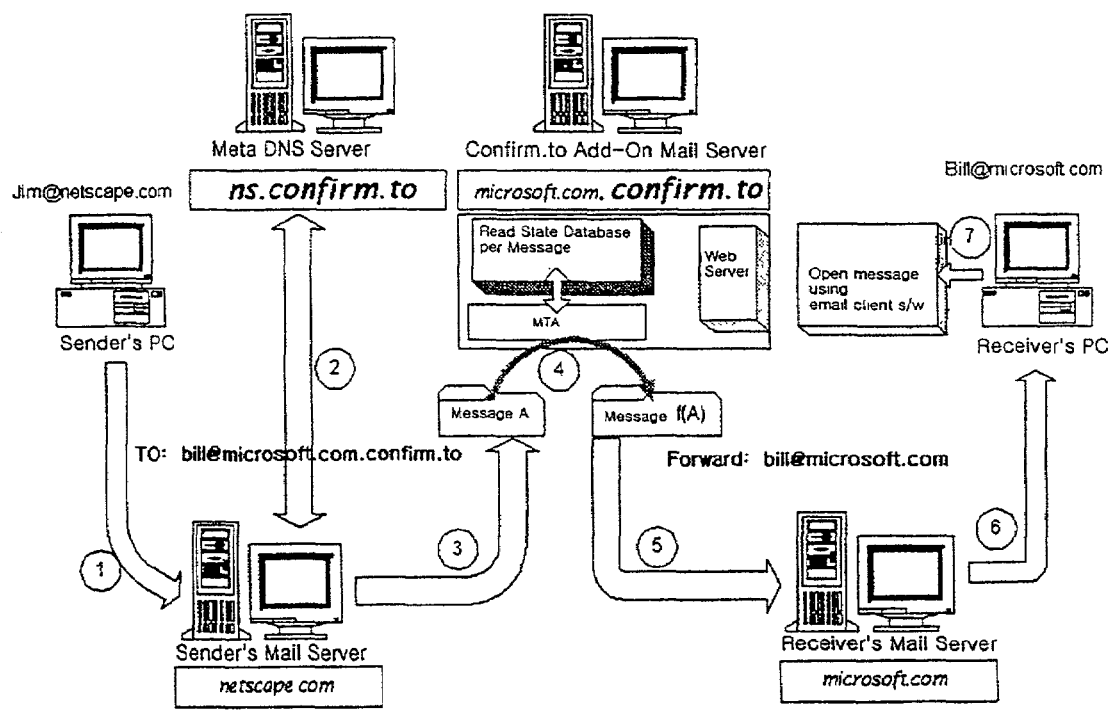
FIG. 3 shows a flow for notifying a message receipt in the mail read confirmation notification system.

FIG. 3 shows flows of transmitting the mail read confirmation notification to the sender through interaction with the web server in the relay server by the HTML tag added in the process 4 of FIG. 2, when the receiver reads the received mail on line.

At this time, it is assumed that the receiver mail client is connected to the Internet on line and common functions to display the HTML tag is prepared (e.g. Outlook Express of Microsoft, Netscape Messenger of Netscape, Eudora Pro of Eudora, etc.).

4-3. Detailed Description for Message Modifying Process for Add-on Service

After endowing a peculiar serial number for each e-mail message, the mail read state database record for storing the mail read state data is generated with the serial number as a key. In the HTML version of the message text, a HTML document having a URL (Uniform Resource Locator) implying the endowed peculiar serial number and a receiver e-mail address.

A suitable HTML tag is selected such that the URL causes interaction between the web server of the relay server and the HTTP protocol by the inserted HTML tag automatically or by recognition behavior of the receiver when the final receiver receives the message and makes the message displayed on a screen may be reflected on the mail read state database.

For example, a tag <img src=http://microsoft.com.confirm.to /read/MESSAGE_ID/bell@microsoft.com width=1 height=1> may be inserted after the text. The tag is an image tag having 1 dot of vertical and horizontal size, which is not easily seen. The tag sends a URL query having the mail read state information to the web server in the relay server, which designated for the HTTP query, in order to update the mail read state information.

In order to add the HTML tag in the text, the mail message text should have an HTML format. Therefore, if the text is a general text (MIME (Multi-purpose Internet Mail Extension) has a text/plain format), the HTML tag is inserted after automatically converting the message text into an HTML format.

The web server reflects the mail read information on the corresponding database, generates a mail read confirmation notification message and then transmits the mail read confirmation notification message to an original sender address written in the record. If ".confirm.cc" is attached to the receiver address as a domain suffix, the web server transmits the notification message not only to the sender but also to other receivers specified in the e-mail message.

5. Lottery Mail Sending Add-on Service System

The lottery mail sending add-on service built as one specific concept of the Internet e-mail add-on service system of the present invention is constructed as follows.

Process 1: Depending on the add-on service mail address representation system of the Element 1 of the present invention, an Internet second domain formally registered in the Internet is selected and registered as a root domain suffix for the lottery mail sending add-on service.

If securing an Internet domain name "loto.to" for that purpose, the meaning of the add-on service is defined as follows. When attaching the domain suffix ".loto.to" at the end of the mail address to be sent, an online lottery ticket issued for the receiver is added to the message to be transmitted. If possible, other domain suffix will be available instead of ".loto.to". A supplementary domain suffix may also be designated. If the supplementary domain suffix has a syntax "add.*", "* (asterisk)" may include a symbol about kind of the lottery known to the sender. For example, a domain "apple.com.add.motorola.loto.to" will be available.

Process 2: Depending on the Meta domain name system of the Element 3 of the present invention, a Meta domain name database having a root domain suffix ".loto.to" and supporting the supplementary domain suffix syntax is constructed. Then, a mail host machine in charge of the service for "DOMAIN.loto.to" is secured and then an IP address thereof is registered.

Process 3: Depending on the relay-mode add-on service mail server of the Element 2 of the present invention, a message modifying mail relay server system for realizing the lottery mail sending add-on service is constructed. Because the service requires management of the mail read state database for a receiver who wins in the lottery, a lottery win state database record for each message is generated and managed in the relay server. Also, the HTML tags are inserted into the modified message such that the receiver may recognize information about the issued online lottery ticket when reading the mail. The server system is installed to each relay mail server host machine registered in the database in the process 2.

6. Picture Post-card Sending Add-on Service System

The picture post-card sending add-on service built as one specific concept of the Internet e-mail add-on service system of the present invention is constructed as follows.

Process 1: Based on the add-on service mail address representation system of the Element 1 of the present invention, an Internet second domain formally registered in the Internet is selected and registered.

If securing an Internet domain name "post-card.to" for that purpose, the meaning of the add-on service is defined as follows. When attaching the domain suffix ".post-card.to" at the end of the mail address to be sent, a HTML type message, in which a picture post-card flourishes a background, is transmitted. If possible, other domain suffix will be available instead of ".post-card.to". A supplementary domain suffix may also be designated. The supplementary domain suffix has a syntax "add.*", in which a "* (asterisk)" may include a symbol about kind of the picture post-card known to the sender. For example, an address attaching a supplementary domain suffix "apple.com.add.yosemite-park.post-card.to" will be available.

Process 2: Based on the Meta domain name system of the Element 3 of the present invention, a Meta domain name database having a root domain suffix ".post-card.to" and supporting the supplementary domain suffix syntax is constructed. Then, a mail host machine in charge of the service for "DOMAIN.post-card.to" is secured and then an IP address thereof is registered.

Process 3: Based on the relay-mode add-on service mail server of the Element 2 of the present invention, a message modifying mail relay server system for realizing the picture post-card sending add-on service is constructed. The relay server should have a database containing symbol and content of the post-card. Also, the HTML tags are inserted in order to analyze kind of the post-card specified in the supplementary domain suffix and apply the post-card as a text background of the modified message. The server system is installed to each relay mail server host machine registered in the database in the process 2.

7. Mail Interpretation Sending Add-on Service System

The mail interpretation sending add-on service built as one specific concept of the Internet e-mail add-on service system of the present invention is constructed as follows.

Process 1: Depending on the add-on service mail address representation system of the Element 1 of the present invention, an Internet second domain formally registered in the Internet is selected and registered.

If securing an Internet domain name "interpret.to" for that purpose, the meaning of the add-on service is as follows. When attaching the domain suffix ".interpret.to" and a supplementary domain suffix ".from.LANG1.to.LANG2" at the end of the mail address to be sent, the service sends a new message interpreted into a designated language to a receiver. If possible, other domain suffix will be available instead of ".interpret.to". The supplementary domain suffix has a syntax "from.*.to.*", and "* (asterisk)" may include a symbol about a language for the interpretation known to the sender. For example, an address attaching a supplementary domain suffix "apple.com.from.english. to.french.interpret.to" will be available.

Process 2: Depending on the Meta domain name system of the Element 3 of the present invention, a Meta domain name database using "interpret.to" as a domain suffix and supporting the supplementary domain suffix syntax is constructed. Then, a mail host machine in charge of the service for "DOMAIN.interpret.to" is secured and then an IP address thereof is registered.

Process 3: Depending on the relay-mode add-on service mail server of the Element 2 of the present invention, a message modifying mail relay server system for realizing the mail interpretation sending add-on service is constructed. The server system is installed to each relay mail server host machine registered in the database in the process 2.

With use of the Internet e-mail add-on service system of the present invention, a sender just attaches a domain suffix for the corresponding add-on service at the end of a receiver e-mail address in order to use the add-on service. The add-on service designated by the domain suffix is automatically executed with use of at least one service host of the add-on service provider.

Therefore, without changing a sender e-mail server and a client software, the service provider in itself may provide the add-on service over the world at once, which promotes emergence of new add-on services and spreads the new add-on service over the world rapidly. This will drive advent, competition and innovation of the e-mail service.

What is claimed is:

1. An e-mail add-on system comprising:
    a domain suffix e-mail address representation system including a syntax of a receiver mail address in form of "USERID@DOMAIN.suffix" having a domain suffix (.suffix) selected for an e-mail add-on service and a series of definitions for meaning of the syntax, the domain suffix having a root domain suffix selected in formally registered domain names in the Internet and a supplementary domain suffix for limiting the add-on service represented by the root domain suffix;
    a relay-mode add-on service mail server installed to an Internet host having a "DOMAIN.suffix" type domain name for receiving a message having a "USERID@DOMAIN.suffix" type receiver e-mail address, the relay-mode add-on service mail server making a new message by processing the add-on service defined in the domain suffix e-mail address representation system and applying options of the add-on service according to contents of the root domain suffix and the supplementary domain suffix specified in ".suffix", the relay-mode add-on service mail server then relaying the new message to an original receiver address "USERID@DOMAIN"; and
    a Meta domain name system including a Meta domain name database for showing relation between a "DOMAIN.suffix" type domain name and an IP (Internet Protocol) address of a relay-mode mail server host in charge of the add-on service designated by ".suffix" for the "DOMAIN" portion, and a domain name server software for providing the add-on service.

2. The e-mail add-on service system as claimed in claim 1,
    wherein, in the domain suffix e-mail address representation, the supplementary domain suffix has a syntax containing a variable parameter for flourishing the options of the add-on service; and
    wherein, the Meta domain name system, the Meta domain database and the Meta domain name server include the syntax containing a variable parameter.

3. The e-mail add-on service system as claimed in claim 1,
    wherein the domain suffix e-mail address representation system uses a pair of second domains having same name and". to" and". cc" as a top-level domain, in which the domain suffix e-mail add-on service system defines that a root domain suffix including ".to" represents a service for transmitting a mail read confirmation notification only to a sender and a root domain suffix including ".cc" represents a service for transmitting the mail read confirmation notification to other receiver except the sender and the receiver;
    wherein the Meta domain name system corresponds to a pair of the domain suffix respectively;
    wherein the e-mail add-on service system further comprises a message modifying relay-mode mail server for adding a HTML (Hypertext Markup Language) tag to a message text and maintaining a mail read state database for each mail message; and
    wherein the e-mail add-on service system further comprises a web server for receiving a HTTP (Hypertext Transfer Protocol) query for a mail read state report from the receiver mail client and transmits a mail read confirmation notification.

4. The e-mail add-on service system as claimed in claim 1, further comprising a message modifying relay-mode mail server for adding a HTML tag containing information for a lottery ticket issued or to be issued to the receiver and maintaining a lottery win state database for each mail message.

5. The e-mail add-on service system as claimed in claim 1, further comprising a message modifying relay-mode mail server for selecting a picture post-card designated by the domain suffix which the sender attaches at the end of the receiver address and modifying the mail message by applying the picture post-card to the mail message.

6. The e-mail add-on service system as claimed in claim 1, further comprising a message modifying relay-mode mail server for modifying the mail message by interpreting and rewriting the mail message into a designated language according to an language interpretation instruction designated by the domain suffix which the sender attaches at the end of the receiver address.

7. An e-mail add-on system comprising:
    a domain suffix e-mail address representation system including a syntax of a receiver mail address in form of "USERID@DOMAIN.suffix" having a domain suffix (.suffix) selected for an e-mail add-on service and a series of definitions for meaning of the syntax, the domain suffix having a root domain suffix selected in formally registered domain names in the Internet and a supplementary domain suffix for limiting the add-on service represented by the root domain suffix;
    a relay-mode add-on service mail server installed to an Internet host having a "DOMAIN.suffix" type domain name for receiving a message having a "USERID@DOMAIN.suffix" type receiver e-mail address, the relay-mode add-on service mail server making a new message by processing the add-on service defined in the domain suffix e-mail address representation system and applying options of the add-on service according to contents of the root domain suffix and the supplementary domain suffix specified in ".suffix", the relay-mode add-on service mail server then relaying the new message to an original receiver address "USERID@DOMAIN"; and
    a Meta domain name system including a Meta domain name database for showing relation between a "DOMAIN.suffix" type domain name and an IP (Internet Protocol) address of a relay-mode mail server host in charge of the add-on service designated by ".suffix"

for the "DOMAIN" portion, and a domain name server software for providing the add-on service;

wherein the domain suffix e-mail address representation system uses a pair of second domains having same name and". to" and". cc" as a top-level domain, in which the domain suffix e-mail add-on service system defines that a root domain suffix including ".to" represents a service for transmitting a mail read confirmation notification only to a sender and a root domain suffix including ".cc" represents a service for transmitting the mail read confirmation notification to other receiver except the sender and the receiver.

8. The e-mail add-on system of claim 7, wherein the Meta domain name system corresponds to a pair of the domain suffix respectively;

wherein the e-mail add-on service system further comprises a message modifying relay-mode mail server for adding a HTML (Hypertext Markup Language) tag to a message text and maintaining a mail read state database for each mail message; and wherein the e-mail add-on service system further comprises a web server for receiving a HTTP (Hypertext Transfer Protocol) query for a mail read state report from the receiver mail client and transmits a mail read confirmation notification.

9. The e-mail add-on service system as claimed in claim 7, wherein, in the domain suffix e-mail address representation, the supplementary domain suffix has a syntax containing a variable parameter for flourishing the options of the add-on service; and wherein, the Meta domain name system, the Meta domain database and the Meta domain name server include the syntax containing a variable parameter.

\* \* \* \* \*